(12) United States Patent
Kim et al.

(10) Patent No.: US 9,819,242 B2
(45) Date of Patent: Nov. 14, 2017

(54) BOBBIN AND ROTOR OF WOUND ROTOR SYNCHRONOUS MOTOR USING THE SAME

(71) Applicant: Hyundai Motor Company, Seoul (KR)

(72) Inventors: Kyoungbum Kim, Gyeonggi-do (KR); Sanghoon Moon, Gyeonggi-do (KR); Hyoungjun Cho, Seoul (KR); Jung Shik Kim, Seoul (KR)

(73) Assignee: Hyundai Motor Company, Seoul (KR)

( * ) Notice: Subject to any disclaimer, the term of this patent is extended or adjusted under 35 U.S.C. 154(b) by 563 days.

(21) Appl. No.: 14/068,499

(22) Filed: Oct. 31, 2013

(65) Prior Publication Data

US 2014/0159540 A1 Jun. 12, 2014

(30) Foreign Application Priority Data

Dec. 12, 2012 (KR) ........................ 10-2012-0144854

(51) Int. Cl.
*H02K 1/22* (2006.01)
*H02K 3/52* (2006.01)
*H02K 1/14* (2006.01)

(52) U.S. Cl.
CPC ............. *H02K 3/522* (2013.01); *H02K 1/148* (2013.01); *H02K 1/22* (2013.01)

(58) Field of Classification Search
CPC ........... H02K 1/22; H02K 1/128; H02K 3/522
USPC ............ 310/43, 45, 194, 214, 215, 216.079, 310/216.088
IPC ....................................................... H02K 1/22
See application file for complete search history.

(56) References Cited

U.S. PATENT DOCUMENTS

| 3,612,930 | A  | * | 10/1971 | Raby | H02K 1/28 310/216.058 |
|---|---|---|---|---|---|
| 6,541,889 | B2 | * | 4/2003 | Moroto | H02K 3/527 310/216.113 |
| 6,573,632 | B2 | * | 6/2003 | Hsu | H02K 1/148 310/194 |
| 6,984,911 | B2 | * | 1/2006 | Horie | H02K 3/325 310/194 |
| 7,396,217 | B2 | * | 7/2008 | Iwanari | F02M 37/048 310/233 |
| 2004/0115077 | A1 | * | 6/2004 | Iwanari | F02M 37/048 417/423.3 |
| 2009/0267443 | A1 | * | 10/2009 | Kim | H02K 1/18 310/216.109 |
| 2011/0115330 | A1 | * | 5/2011 | York | H02K 3/528 310/215 |
| 2011/0241471 | A1 | * | 10/2011 | Tokizawa | H02K 1/243 310/185 |
| 2012/0263612 | A1 | * | 10/2012 | Matsuzaki | F04D 13/0666 417/410.1 |

(Continued)

FOREIGN PATENT DOCUMENTS

JP 09-182342 7/1997
JP 2011-114993 A 6/2011

*Primary Examiner* — John K Kim
(74) *Attorney, Agent, or Firm* — Mintz Levin Cohn Ferris Glovsky and Popeo, P.C.; Peter F. Corless (57) ABSTRACT

A rotor of a wound rotor synchronous motor is manufactured by forming a rotor core using a plurality of core blocks, and fitting bobbins with a coil wound onto the core blocks. In particular, the core blocks are connected such that tops of the bobbins extend from bobbin bodies and are connected with tops of other bobbins fitted on the adjacent core blocks. Additionally, a molding material may be injected into spaces between the core blocks.

7 Claims, 7 Drawing Sheets

(56) References Cited

U.S. PATENT DOCUMENTS

2014/0159540 A1\* 6/2014 Kim ...................... H02K 3/522
310/264

\* cited by examiner

FIG. 1

RELATED ART

BOBBIN AND ROTOR OF WOUND ROTOR SYNCHRONOUS MOTOR USING THE SAME

CROSS-REFERENCE TO RELATED APPLICATION

This application claims priority to and the benefit of Korean Patent Application No. 10-2012-0144854 filed in the Korean Intellectual Property Office on Dec. 12, 2012, the entire contents of which are incorporated herein by reference.

BACKGROUND (a) Field of the Invention

The present invention relates to a bobbin of which the rotor can be molded without a mold, and a rotor of a wound rotor synchronous motor using the same.

(b) Description of the Related Art

In general, in a WRSM (Wound Rotor Synchronous Motor), a coil is wound around not only a stator, but a rotor as well and current is applied to the coil to create an electromagnetic field. With the increase in cost of raw materials for permanent magnets made of rare earth materials in recent years, efforts for developing a WRSM which can replace an IPMSM (Interior Permanent Magnet Synchronous Motor) have increased.

In particular, a WRSM requires that a coil space factor be increased as high as possible in order to reduce copper loss generated by current flowing the coil wound around the rotor and increase efficiency, and in order to increase the coil space factor, a method of forming not only a stator, but a rotor using core blocks and by inserting a bobbin with a coil wounded in the core blocks is typically used.

A rotor assembled as described above is disposed inside a stator so as to have a predetermined gap, a magnetic field is generated, when power is applied to the coils of the stator and the rotor, and the rotor is rotated by a magnetic action generated between the stator and the rotor. As is well known by those skilled in the art, outer diameter of the rotor are eccentric in nature, e.g., the outer diameters of the core, to reduce any influence from a torque ripple in rotation of the rotor.

On the other hand, in the WRSM that is used for operation of electric motors in electric and hybrid vehicles, the rotor rotates at fairly high speed, e.g., 10000 rpm, during which time the coil wound around the rotor is moved radially outward by the centrifugal force and comes in contact with the core of the stator. In order to correct this phenomenon, a mold has been disposed on an outer surface of the rotor and the coil is fixed on the rotor by injecting a molding material into the spaces between core blocks.

However, the above molding process requires a mold to be aligned in a predetermined line, for rotors which typically have an eccentric outer surface or diameter.

Figure 1:
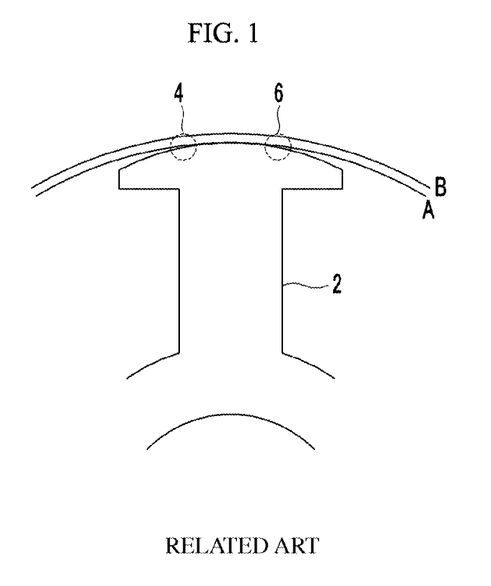
FIG. 1 is a schematic diagram showing when a core block with an eccentric outer diameter is molded.

As shown in FIG. 1, a mold is formed in a circle, whereas the outer diameters of core blocks 2 of a rotor eccentrically change so that the outer circumferences curve inward as they come closer to both ends thereof from the centers, such that when a mold is formed to fit along the center line A of the outer diameters of the core blocks 2, both sides 4 and 6 out of the center of the outer diameters of the core blocks rotate and a molding material becomes detached.

Additionally, when a mold is formed to fit along a line B at a predetermined distance from the outer diameters of core blocks in order to prevent this detachment, the gap between the inner diameter of a stator and the outer diameter of the rotator increases, and this resists the flow of a magnetic flux.

The above information disclosed in this Background section is only for enhancement of understanding of the background of the invention and therefore it may contain information that does not form the prior art that is already known in this country to a person of ordinary skill in the art.

SUMMARY

The present invention has been made in an effort to provide a bobbin which has a small gap even if the diameter of a rotor is eccentric and makes it possible to mold the rotor without the need for an additional mold. A plurality of the above bobbins are then applied a rotor of a wound rotor synchronous motor.

An exemplary embodiment of the present invention provides a bobbin fitted on core blocks of a rotor. The top of this bobbin extends from a body of the bobbin and is connected with a top portion of a different bobbin fitted on an adjacent core block Additionally, core block grooves may be formed on an inside of the bobbin and top and bottom plates are formed at the top and a bottom of the body of the bobbin, the top plate extending so as to bend or curve downward. Also, the top plate may have a supporting body that supports the top of the core block and molding frame portions extending from the supporting portion.

In some exemplary embodiments of the present invention, connecting steps corresponding to each other may be formed on a top and a bottom of each side of the molding frame portions, respectively, and the bobbin may be longitudinally divided and combined.

Another exemplary embodiment of the present invention provides a rotor of a wound rotor synchronous motor, in which a rotor core is formed by a plurality of core blocks, and bobbins with a coil wound therearound are fitted on the core blocks respectively. These core blocks are connected and assembled together to form the rotor. Additionally, tops of bobbins extend from bobbin bodes and are connected with the tops of the bobbins fitted on adjacent core blocks, and a molding material is injected in spaces between the core blocks.

The bobbin may have a bobbin body where a core block groove is formed on an inside thereof and top and bottom plates formed at a top portion and a bottom portion of the bobbin, and the top plate may be extended outward so as to bend or curve downward. The top plate of the bobbin may have a supporting portion that supports the top of the core block and molding frame portions extending from the supporting portion. Additionally, connecting steps corresponding to each other may be formed on top and bottom portions of sides of the molding frame portions, respectively.

In some exemplary embodiments, core block may include a body where the coil is wound therearound and a lower connecting portion that comes in contact with a shaft, and the plurality of core blocks are combined by fitting a side of a lower connecting portion of a first bobbin with a side of a lower connecting portion of a second bobbin. A protrusion and a protrusion groove, which correspond to each other, may be also be respectively formed on both sides of the lower connecting portions of the core blocks and the core blocks may be assembled in a ring shape by fitting adjacent core blocks together.

Advantageously, according to an exemplary embodiment of the present invention, it is possible to create a smaller gap between the inner diameter of the stator and the outer diameter of the rotor, even when the outer diameter of the rotor is eccentric. Further, due to the structure of the bobbins described herein, it is possible to eliminate the need for an additional molding frame, thereby reducing the overall cost of the motor.

DETAILED DESCRIPTION OF THE EMBODIMENTS

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles, fuel cell vehicles, and other alternative fuel vehicles (e.g. fuels derived from resources other than petroleum).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Exemplary embodiments of the present invention will be described hereafter in detail with reference to the accompanying drawings.

Furthermore, the exemplary embodiments described herein and the configurations shown in the drawings are provided only for explanation of the exemplary embodiments of the present invention and may necessarily not fully cover the spirit of the present invention; therefore, it should be understood that there may be various equivalents and modifications that can replace them at the time of the application.

Figure 2:
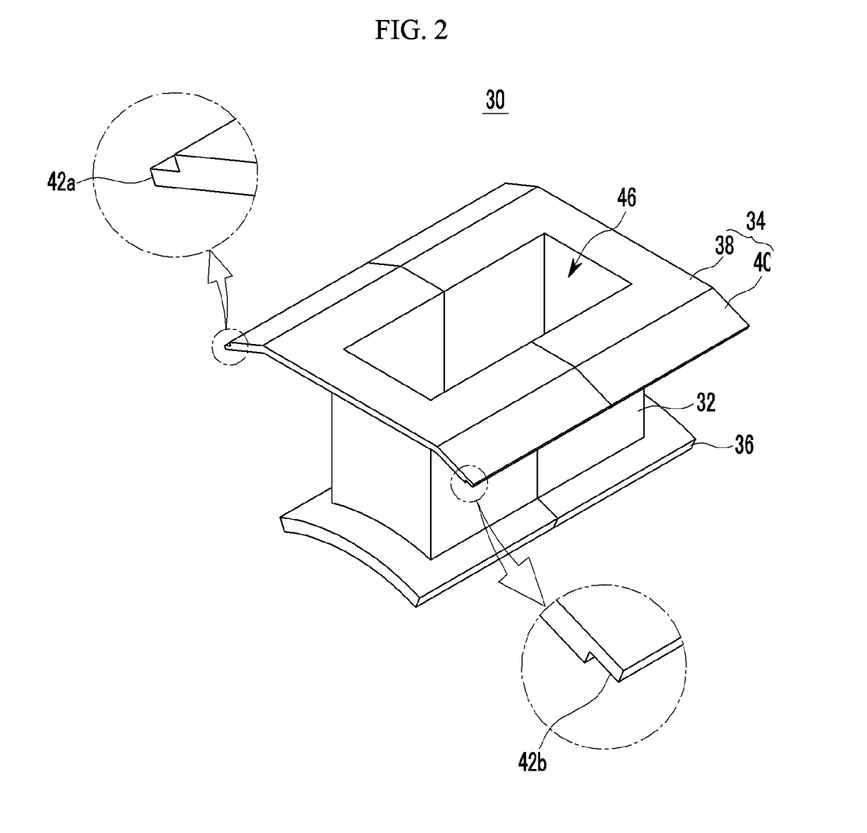
FIG. 2 is a perspective view showing a bobbin according to an exemplary embodiment of the present invention.
Figure 3:
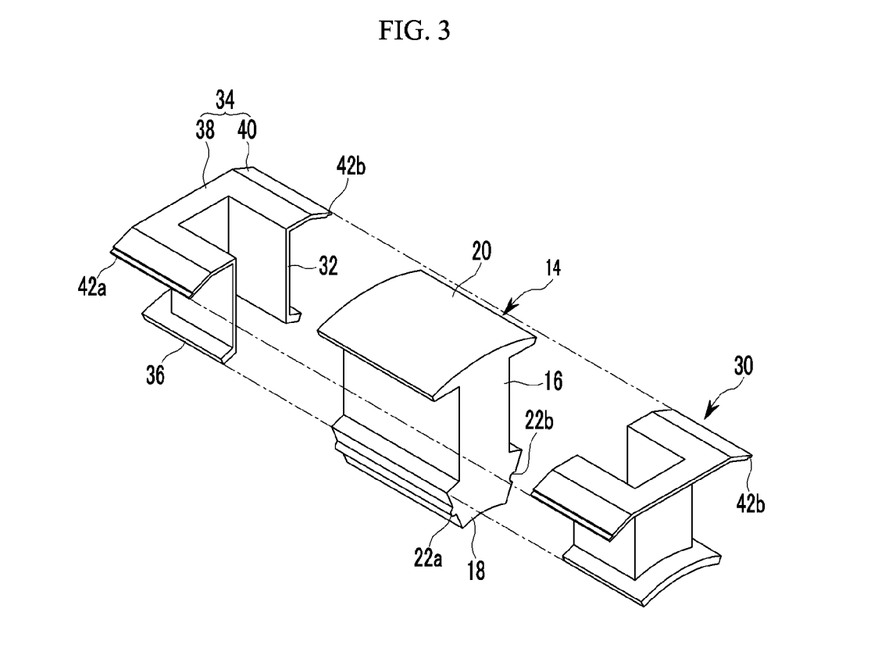
FIG. 3 is a perspective view showing when bobbins according to an exemplary embodiment of the present invention are fitted onto core blocks.
Figure 4:
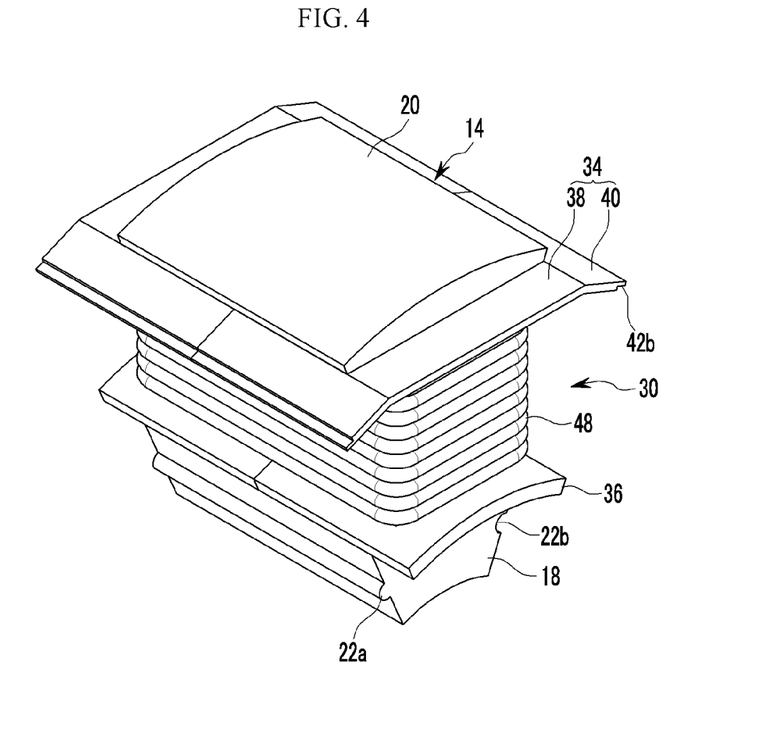
FIG. 4 is a perspective view showing when bobbins according to an exemplary embodiment of the present invention have been fitted on core blocks.
Figure 5:
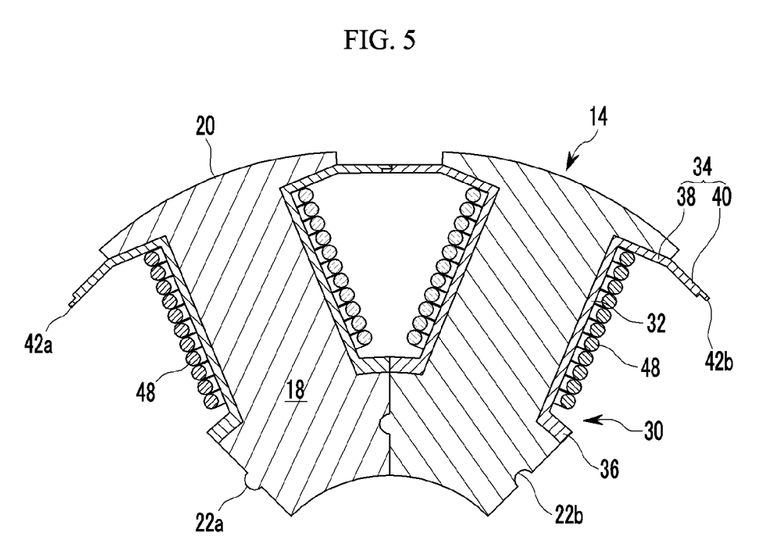
FIG. 5 is a side cross-sectional view showing that core blocks with bobbin fitted thereon are assembled.

FIG. 2 is a perspective view showing a bobbin according to an exemplary embodiment of the present invention, FIG. 3 is a perspective view showing when bobbins according to an exemplary embodiment of the present invention are fitted on core blocks, FIG. 4 is a perspective view showing when bobbins according to an exemplary embodiment of the present invention have been fitted on core blocks. FIG. 5 is a side cross-sectional view showing that core blocks with a bobbin fitted on them are assembled, FIG. 6 is a schematic diagram showing when core blocks with a bobbin according to an exemplary embodiment of the present invention fitted on them have been assembled, FIG. 7 is a schematic diagram of a rotor according to an exemplary embodiment of the present invention.

Figure 6:
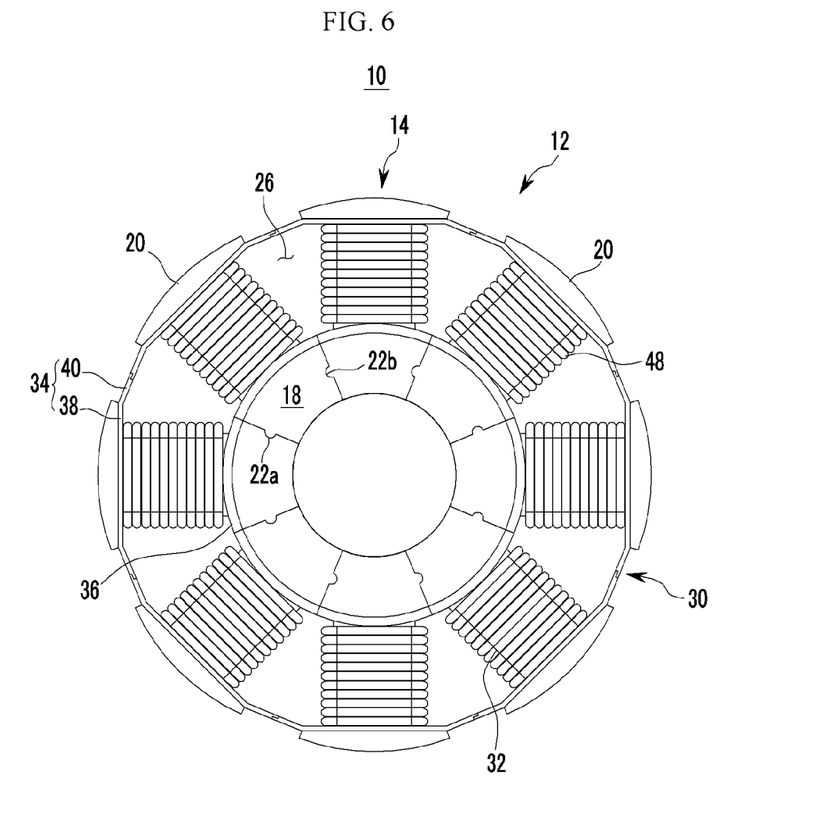
FIG. 6 is a schematic diagram showing when core blocks with a bobbin according to an exemplary embodiment of the present invention fitted thereon have been assembled.
Figure 7:
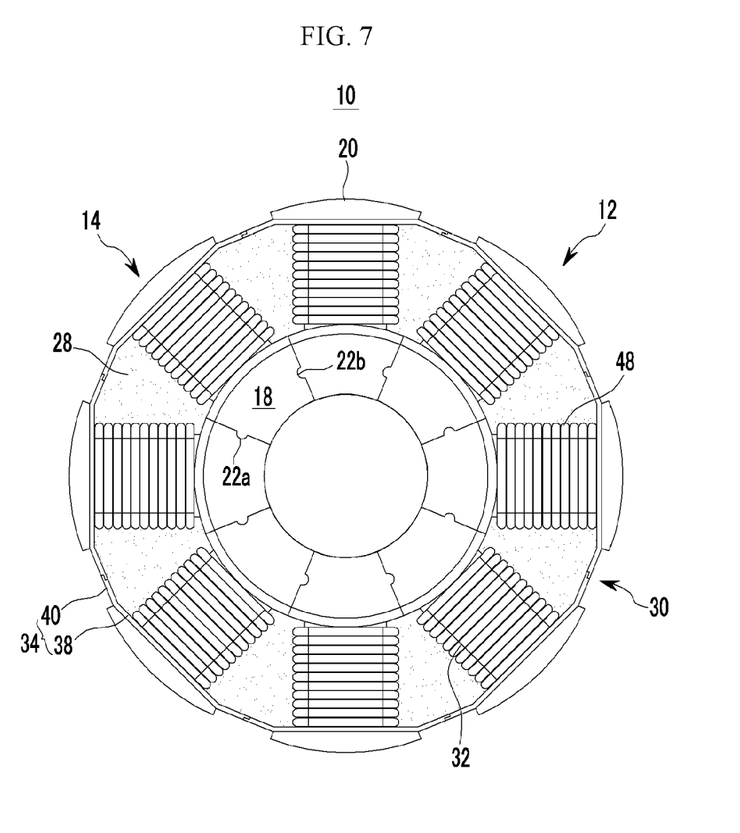
FIG. 7 is a schematic diagram of a rotor according to an exemplary embodiment of the present invention.

Referring to FIGS. 6 and 7, in a rotor 10 of a wound rotor synchronous motor according to an exemplary embodiment of the present invention, the upper (top) portions of bobbins 30 are on a plurality of core blocks 14. These upper portions (e.g., top plate 34) extend from bobbin bodies 32 and can be connected with the upper portions 31 of bobbins 30 fitted on adjacent core blocks.

The rotor 10 according to an exemplary embodiment of the present invention includes a rotor core 12 formed by a plurality of core blocks 14, and bobbins 30 fitted on the core blocks 14. The rotor core 12 may be assembled in a ring shape by circumferentially arranging the core blocks 14 each disposed a predetermined distance apart 26. The inner side of the rotor core 12 is brought in contact with a shaft and the outer side is disposed opposite a stator (not shown) with a predetermined sized gap therebetween.

The core blocks 14 of the rotor core 12, as shown in FIGS. 3 and 4, are each composed of a body 16 wound with a coil 48 therearound, a lower connecting portion 18 at the lower portion of the body 16, and a roof 20 at the upper portion of the body 16. The body 16 of the core block 14 is formed so as to have a rectangular cross section and bobbins 30 with the coil 48 wound therearound are fitted on the body 16.

A roof 20 protruding horizontally further than the body 16 may be formed at the upper portion of the body 16 of the core block 14. The top of the roof 20 is illustratively smoothly curved such that the roofs 20 of the core blocks 14 which have been assembled make substantially circle.

The lower connecting portion 18 of the core block 14 may be formed in a fan shape, as shown in FIG. 5, and the lower connecting portions 18 of the adjacent core blocks 14 may be connected in a ring shape via the assembly with an adjacent lower connecting portion of another bobbin. The lower connecting portions 18 of the assembled core blocks 14, as shown in FIG. 6, form an inner side of the rotor core 12 that comes in contact with a shaft (not shown). The lower connecting portion 18 of the core block 14 may have a protrusion 22a and a protrusion groove 22b, which correspond to each other, on both sides, respectively. The adjacent core blocks 14 may be disposed with the protrusions 22a and the protrusion grooves 22b facing each other and may be fitted into each other to connect an adjacent core block thereto.

The bobbins 30 to be fitted on the core blocks 14 may each be composed of a bobbin body 32 where a core block groove 46 is formed and top and bottom plates 34 and 36 formed at the top and bottom, respectively, of the bobbin body 32. The bobbin body 32 may be formed to have a rectangular cross sectional shape and a coil 48 is wound around therearound. The core block groove 46 is formed inside the bobbin body 32.

A top plate 34 and the bottom plate 36 may also be integrally formed at the top and bottom, respectively, of the bobbin body 32. The top plate 34 of the bobbin 30 extends horizontally from the bobbin body 32 to be connected with the top plates 34 of the bobbins 30 fitted on the adjacent core blocks 14. The top plate 34 of the bobbin 30 may be either bent or curved downward while extending, however the top plate 34 of the bobbin 30 is bent downward in the description of an exemplary embodiment of the present invention.

The top plate 34 of the bobbin 30 is composed of a support portion 38 that supports the roof 20 of the core block 14 and molding frame portions 40 extending from the support portion 38. As such, the support portion 38 of the top plate 34 may also be a rectangular plate extending horizontally from the top of the bobbin body 32.

The molding frame portions 40 of the top plate 34 may extend at angularly downward from the support portion 38, and may be connected with the top plates 34 of the bobbins 30 fitted on the adjacent core blocks 14 and function as top molding frames of the spaces 26 between the bodies 16 of the core blocks 14.

As such, the molding frame portions 40 extending horizontally allows the coil 48 to be further wound around the body 16 of the core block 14 and fix the coil 48 wound around the body 16 of the core block 14 so that the coil 48 does not become separated while the rotor 10 rotates.

Connecting steps 42a and 42b corresponding to each other are formed on the sides of the molding frame portions 40, respectively. These connecting steps 42a and 42b may be arranged to correspond to the connecting steps 42a and 42b of the molding frame portions 40 of the bobbins 30 fitted on the adjacent core blocks 14 so as to further secure the molding frame portions of adjacent core blocks together.

As stated above, the bottom plate 36 of the bobbin 30 may be curved downward so that it can cover the top of the lower connecting portion 18 of the core block 14. The bottom plates 36 of the bobbins 30 function as bottom molding frames of the spaces 26 between the bodies 16 of the core blocks 14. As such, the bottom plates 36 of the bobbins 30 are connected with the bottom plates 36 of the adjacent bobbins 30 in a circular shape. The bobbin 30 is longitudinally divided into halves, as shown in FIG. 3, and the halves are combined after being fitted on the core block 14.

The method of assembling the rotor 10 of a wound rotor synchronous motor according to an exemplary embodiment of the present invention is described hereafter with reference to FIGS. 2 to 7.

First, the bobbins 30 are fitted on the core blocks 14 and then the coils 48 are wounded around the bobbin bodies 32. The core blocks 14 with the bobbins 30 fitted thereon are circumferentially arranged and assembled. In assembly, the lower connecting portions 18 of the core blocks 14 are assembled by fitting the protrusions 22a on the sides into the protrusion grooves 22b and the top plates 34 of the bobbins 30 are assembled by fitting the connecting steps 42a and 42b corresponding to each other.

Further, the bottom plates 36 of the bobbins 30 are connected with the bottom plates 36 of the adjacent bobbins 30 in a circular shape. When the assembly is finished, predetermined spaces 26 are defined between the bodies 16 of the core blocks 14 and a molding material 28 is injected and dried in the spaces 26. The molding material 28 injected in the spaces 26 between the core blocks 14 fixes the coils 48 wound around the bobbins 30.

By the configuration described above, the rotor 10 of a wound rotor synchronous motor according to an exemplary embodiment of the present invention is becomes more economical, because the structure of the bobbins used in the related art has been altered so that the bobbins themselves are used as molding frames without having to additionally implement a another molding frame.

Further, since the bobbin 30 that is necessary for insulation between the core block 14 and the coil 48 is used as a molding frame, as it is, it is possible to create a smaller gap between the inner diameter of the stator (not shown) and the outer diameter of the rotor 10, even when the outer diameter of the rotor 10 is eccentric.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

DESCRIPTION OF SYMBOLS

10: Rotor
12: Rotor core
14: Core block
28: molding material
30: Bobbin
32: Bobbin body
34: Top plate
36: Bottom plate
38: Supporting portion
40: Molding frame portion
42a,42b: Connecting step
46: Core block groove

What is claimed is:

1. A bobbin fitted on a core block of a rotor, wherein the bobbin includes a coil wound therearound, a core block groove is formed on an inside of the bobbin, top and bottom plates are formed at a top and a bottom of a body of the bobbin, the top plate includes a supporting portion that supports a roof of the core block and a molding frame portion bent downwardly from the supporting portion, a space is formed by the bobbin and a different bobbin fitted on an adjacent core block, and the core block and the adjacent core block are circumferentially arranged based on a shaft of the rotor.

2. The bobbin of claim 1, wherein connecting steps corresponding to each other are formed on a top and a bottom of the molding frame portion.

3. The bobbin of claim 1, wherein the bobbin is longitudinally divided and combined.

4. A rotor of a wound rotor synchronous motor, wherein a rotor core is formed by a plurality of core blocks circumferentially arranged based on a shaft of the rotor, bobbins each with a coil wound therearound are fitted on the core blocks, a core block groove is formed on an inside of the bobbin, top and bottom plates are formed at a top and a bottom of a body of the bobbin, the top plate includes a supporting portion that supports a roof of the core block and a molding frame portion bent downwardly from the supporting portion, a space is formed by the bobbin and a different bobbin fitted on an adjacent core block, and a molding material is injected within the spaces.

5. The rotor of claim 4, wherein connecting steps corresponding to each other are formed on a top and a bottom of the molding frame portion.

6. The rotor of claim 4, wherein each core block includes a body where the coil is wound therearound and a lower connecting portion that comes in contact with a shaft, and the plurality of core blocks are combined by fitting a side of a lower connecting portion of a first bobbin with a side of a lower connecting portion of a second bobbin.

7. The rotor of claim 6, wherein a protrusion and a protrusion groove, which correspond to each other, are respectively formed on both sides of each lower connecting portion of each of the core blocks and the plurality of core blocks are assembled in a ring shape by fitting together adjacent core blocks.

\* \* \* \* \*